(12) United States Patent
O'Connor et al.

(10) Patent No.: US 9,542,657 B2
(45) Date of Patent: Jan. 10, 2017

(54) METHOD AND SYSTEM FOR OPTIMIZING CONTACT CENTER PERFORMANCE

(75) Inventors: Neil O'Connor, Galway (IE); Paul D'Arcy, Limerick (IE); Seamus Hayes, County Longford (IE)

(73) Assignee: Avaya Inc., Basking Ridge, NJ (US)

( * ) Notice: Subject to any disclaimer, the term of this patent is extended or adjusted under 35 U.S.C. 154(b) by 203 days.

(21) Appl. No.: 13/189,633

(22) Filed: Jul. 25, 2011

(65) Prior Publication Data

US 2012/0215579 A1    Aug. 23, 2012

Related U.S. Application Data

(63) Continuation-in-part of application No. 13/032,864, filed on Feb. 23, 2011, now abandoned.

(51) Int. Cl.
    *G06Q 10/00*    (2012.01)
    *H04M 3/51*    (2006.01)
    *G06Q 10/06*    (2012.01)

(52) U.S. Cl.
    CPC ........... *G06Q 10/00* (2013.01); *G06Q 10/063* (2013.01); *H04M 3/5175* (2013.01)

(58) Field of Classification Search
    CPC ..... G06Q 10/00; G06Q 10/063; H04M 3/5175
    USPC ............................................... 705/7.13, 7.22
    See application file for complete search history.

(56) References Cited

U.S. PATENT DOCUMENTS

| | | | | |
|---|---|---|---|---|
| 5,121,467 | A * | 6/1992 | Skeirik | G05B 13/029 706/10 |
| 5,835,901 | A * | 11/1998 | Duvoisin, III | G06K 9/627 706/16 |
| 6,138,139 | A * | 10/2000 | Beck et al. | 709/202 |
| 6,856,680 | B2 * | 2/2005 | Mengshoel et al. | 379/265.06 |
| 6,879,586 | B2 * | 4/2005 | Miloslavsky et al. | 370/356 |
| 7,103,553 | B2 * | 9/2006 | Applebaum et al. | 704/275 |
| 7,137,126 | B1 * | 11/2006 | Coffman | G06F 17/30899 704/200 |
| 7,644,057 | B2 * | 1/2010 | Nelken et al. | 706/55 |
| 8,045,697 | B1 * | 10/2011 | Martin | 379/265.12 |

(Continued)

OTHER PUBLICATIONS

Ross Graham, 2006, Real-time Agent Navigation with Neural Networks for Computer Games, Institute of Technology Blanchardstown, pp. 1-124.*

(Continued)

*Primary Examiner* — Matthew Gart
*Assistant Examiner* — Stephen S Swartz (57) ABSTRACT

A method for assigning individual contact processing resources of a contact center to contacts in the contact center is disclosed. On receiving a new contact at the contact center, a contact object corresponding to the new contact is provided within a population of contact objects corresponding to contacts being processed by the contact center. A programmed processing object corresponding to each individual contact processing resource of the contact center is provided. Each processing object is arranged to adaptively and independently select contact objects from the population of contact objects based on a value received for processing contacts from the population and a value spent on processing contacts from the population. Once a programmed processing object selects a contact object, an associated contact processing resource is assigned to the contact.

23 Claims, 3 Drawing Sheets

(56) References Cited

U.S. PATENT DOCUMENTS

| | | | |
|---|---|---|---|
| 8,165,916 B2* | 4/2012 | Hoffberg et al. | 705/14.53 |
| 8,417,715 B1* | 4/2013 | Bruckhaus | G06F 17/30994 705/26.1 |
| 8,612,272 B1* | 12/2013 | Aykin | G06Q 10/063 705/7.11 |
| 8,849,685 B2* | 9/2014 | Oden | G06Q 10/063 705/7.11 |
| 2003/0182362 A1* | 9/2003 | Jensen et al. | 709/203 |
| 2004/0193475 A1* | 9/2004 | Hemm et al. | 705/9 |
| 2004/0249636 A1* | 12/2004 | Applebaum et al. | 704/231 |
| 2005/0213743 A1* | 9/2005 | Huet | G06Q 10/10 379/265.09 |
| 2005/0251435 A1* | 11/2005 | Paolella | G06Q 10/00 705/7.13 |
| 2006/0256953 A1* | 11/2006 | Pulaski et al. | 379/265.06 |
| 2007/0021966 A1* | 1/2007 | Ellefson et al. | 705/1 |
| 2007/0071206 A1* | 3/2007 | Gainsboro et al. | 379/168 |
| 2007/0174101 A1* | 7/2007 | Li | G06Q 10/06 705/7.26 |
| 2008/0104152 A1* | 5/2008 | Stephens et al. | 707/206 |
| 2008/0120164 A1* | 5/2008 | Hassler | 705/9 |
| 2009/0190740 A1* | 7/2009 | Chishti et al. | 379/265.06 |
| 2009/0190745 A1* | 7/2009 | Xie et al. | 379/265.11 |
| 2009/0190749 A1* | 7/2009 | Xie et al. | 379/266.01 |
| 2010/0088673 A1* | 4/2010 | Chen et al. | 717/110 |
| 2010/0296417 A1* | 11/2010 | Steiner | 370/260 |

OTHER PUBLICATIONS

Rico E. Collado; Substantive Examination Report; Philippines Application No. 1/20121000209; Mar. 7, 2016; Intellectual Property Office of the Philippines, Taguig City, Philippines.

* cited by examiner

METHOD AND SYSTEM FOR OPTIMIZING CONTACT CENTER PERFORMANCE

CROSS-REFERENCE TO RELATED APPLICATIONS

This application is a continuation-in-part of U.S. patent application Ser. No. 13/032,864, filed on Feb. 23, 2011, the content of which is hereby incorporated by reference in its entirety.

BACKGROUND

Field of the Invention

This invention relates to an improved contact center system and method for assigning individual contact processing resources of the contact center to contacts in the contact center.

Description of the Related Art

Figure 1:
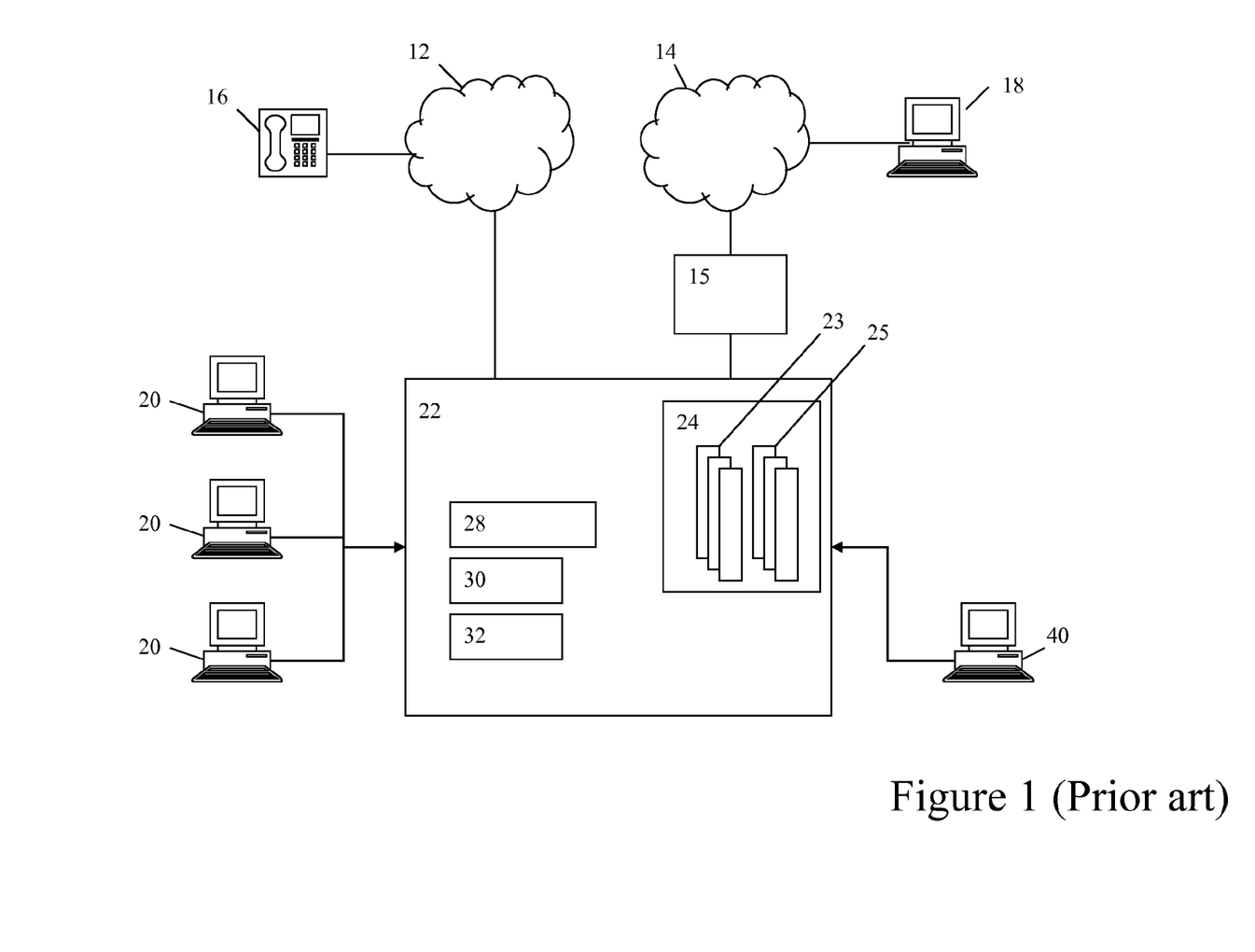
FIG. 1 shows a conventional contact center.

Referring to FIG. 1, contact centers 22, including traditional voice-only call centers as well as multimedia contact centers adapted to handle contacts in other media, employ numerous agents 20, 40, having various skillsets to service customers 16, 18.

The contact center of FIG. 1 is connected to the public switched telephone network (PSTN) 12 and to the Internet 14. An Internet telephony gateway 15 is provided to translate between a private branch exchange (not shown) in the contact center and the Internet 14. Alternatively, the contact center could be enabled for voice over IP (VoIP) communications, such that direct telephony communications with the Internet may be made, and in such cases, translation between the VoIP environment of the contact center and the PSTN 12 can mediated by appropriate equipment in known manner. Using the PSTN 12 and Internet 14, respectively, customers 16, 18 may connect to the contact center using conventional telephony equipment, as in the case of customer 16, or using Internet-enabled hardware or software, as in the case of customer 18 (e.g. dedicated voice or video Internet telephony equipment, or a computer with appropriate software for such telephony, or a computer with instant messaging or e-mail software).

The most common solution for handling contacts is to maintain within a queuing system 24, queues for agents (resources) 25 and queues for contacts 23 and matching contacts to agents according to priority, skillset etc.

The contact center server 22 is typically programmed with workflows 28 so that an incoming contact from a customer 16, 18, is processed in accordance with the instructions contained in a workflow 28. Typically, this may involve placing a call in a conference with an interactive voice response (IVR) server 30, which plays recorded announcements to the customer and requests inputs from the customer. These inputs are stored and used by the contact center to traverse an IVR workflow until all relevant information has been gleaned from the client, and subsequently, to place the contact in one of the queues 23. Usually, this is done by assigning the contact to one or more skillsets, each skillset being serviced by an agent or group of agents with the requisite skills to handle queries relating to that skillset.

If an agent is free, the contact can be assigned directly to an agent (by manipulation of appropriate software objects in the queues 24), with the result that the customer is placed in conference with one of the agents 20, 40, who can then deal directly with the questions or concerns of the customer. More typically, agent resources are limited and the contact is assigned to a contact skillset queue 23 along with other contacts, which are waiting for the same agent resources. The contacts are serviced according to various criteria including waiting time, priority, urgency, media type and so forth. When a contact reaches the top of a queue, it is assigned to the next available agent. During the time that a contact is in a queue, the caller will typically be placed on hold and provided with entertainment, music, announcements, advertisement or other content, represented in FIG. 1 by music-on-hold server 32. It is not unusual in such circumstances to occasionally provide the customer with an indication of the position in queue or the wait time expected until an agent is free, or to allow the customer to request such information by making appropriate key presses or speaking appropriate key words.

Separately, it is also known to provide a work assignment engine (WAE) within a contact center with a view to providing a queueless contact center. Here, contacts and agents are maintained as data objects within the contact center. The WAE constantly sweeps over the data objects allocating contacts to agents according to customer need and contact center goals.

Meeting the needs of the customers 16, 18 in a timely and efficient manner is paramount to a successful and profitable contact center and it is an object of the present invention to further optimize contact center performance.

SUMMARY

According to the present invention there is provided a method for assigning individual contact processing resources of a contact center to contacts in the contact center according to claim 1.

The invention manages the relationship between the producers and consumers of contacts in a contact center. The producers are the portals that introduce contacts, such as a PSTN trunk, an email server, a social media gateway etc. The consumers are the resources of the contact center such as agents, IVR ports and auto-response simulators etc.

Embodiments of the invention comprise a contact center and a method for operating a contact center in which the consumers of work such as IVR ports and agents are implemented with predatory neural networks, referred to herein as neural Bots, that compete to accumulate reward on consuming prey i.e. processing contacts. The reward is orchestrated to optimise the goals of the contact center.

Contacts can also be modelled as a separate class of neural Bot, which compete for the attention of the predators in the system.

Preferably, the behaviour of the Bots mutates over time to provide a self-learning contact center.

BRIEF DESCRIPTION OF THE DRAWINGS

Embodiments of the invention will now be described, by way of example, with reference to the accompanying drawings, in which.

DETAILED DESCRIPTION

Figure 2:
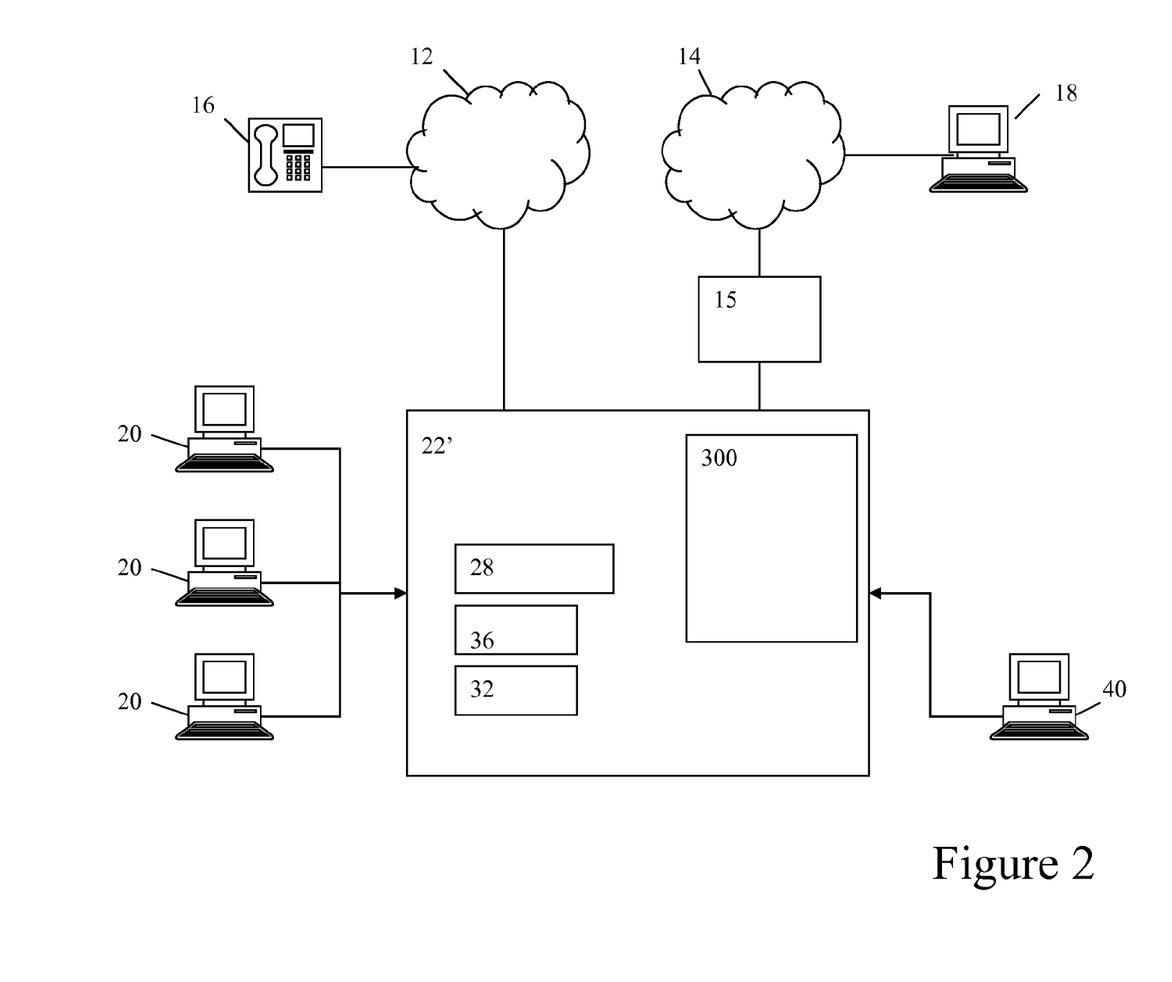
FIG. 2 shows a contact center according to an embodiment of the present invention.

Referring now to the drawings wherein like numerals are used to describe similar elements, in FIG. 2 there is indicated, generally at 22', a contact center according to an embodiment of the invention.

The contact center 22' itself is, to a large extent, conventional, and the operation of such a contact center will be well known to the skilled person. Thus, for example, a plurality of agent workstations 20 are provided allowing human agents to service both incoming and outgoing contacts. While this embodiment is described as a multimedia contact center serving contacts of different media types in addition to or instead of simple voice calls, it will be appreciated that the invention could equally be implemented in a voice-contact only contact center. In the embodiment, the contact center 22' may service video calls, instant messaging (IM) sessions and emails, to provide but a few examples, with each agent workstation 20 being provided with suitable client software to enable contacts in the relevant media types to be presented to the agent. Thus, the client software can be integrated with, for example, telephony equipment or video equipment so that the agent is enabled to speak with the customers 16, 18 by voice or video link and/or reply to e-mails or instant messages.

In the embodiment, the contact center server 22' further comprises an improved work assignment engine, WAE, 36 arranged to allocate and route the processing resources of the contact center to suitable contacts in an optimal fashion.

Rather than a centralized software process or hardware processor or hybrid as in previous Work Assignment Engines, in the case of the present Work Assignment Engine 36, each available agent whether a customer service agent 20, IVR port, Auto-Response simulator or possibly a supervisor agent 40 is implemented with an associated instance of Neural Bot. Each Bot can run as an independent process, as a thread within a multi-threaded process or indeed could be implemented in some form of hardware or hybrid as long as it is capable of accessing contact information.

Figure 3:
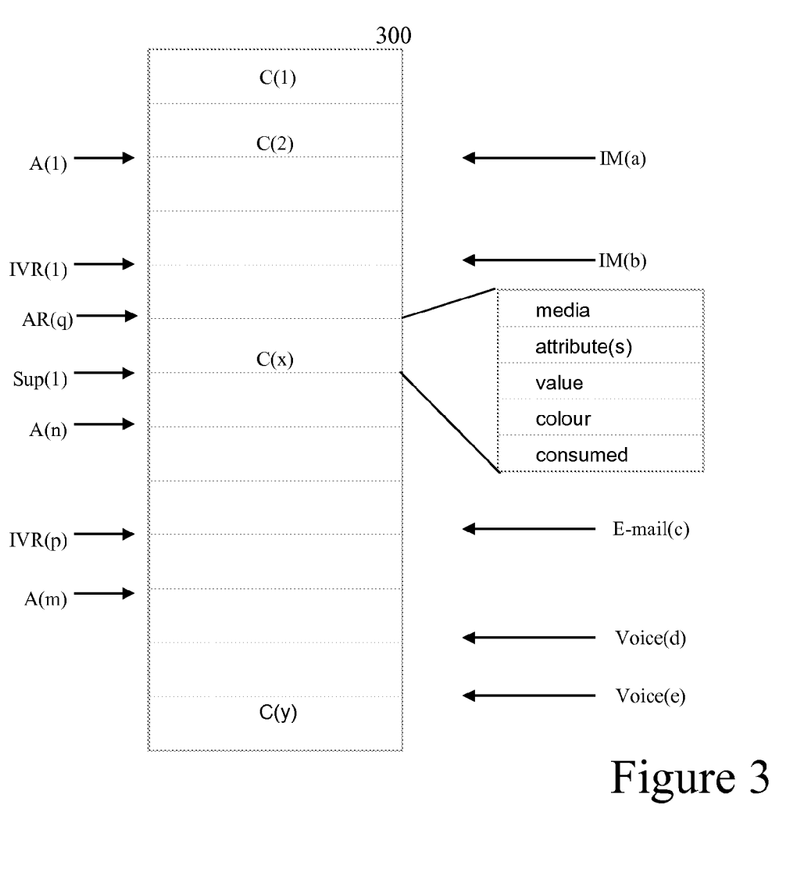
FIG. 3 shows schematically the relationship between entities involved in an embodiment of the invention.

Referring to FIG. 3, in a simple implementation, contacts are represented by linear ordered objects $C(1) \ldots C(x) \ldots C(y)$ stored in a database table 300. FIG. 3 shows the objects according to their logical relationship, with contact $C(1)$ being located furthest from contact $C(y)$, however, it will be appreciated that contacts do not need to be stored in a corresponding manner in memory. Indeed the logical relationship between contacts need not be scalar as shown in FIG. 3, and the schema could be extended into further dimensions if required depending on the notional spatial relationship between contacts within a given dataspace. In some implementations, contacts within the table could be stored logically within one or more double-linked list(s) according to the dimensionality of the dataspace, to avoid needing to continually re-organise memory to add new contacts and to enable ready logical traversal of the dataspace. In any case, it will be appreciated that the schema shown in FIG. 3 is for exemplary purposes only and many variants of this schema will fall within the scope of the present invention.

As shown for contact $C(x)$, in the present embodiment, each contact object has a number of types of attributes including, but not limited to:

media type, for example, voice, e-mail, Instant Message, web chat, social media communication (e.g. Facebook, Twitter), or virtual world communication (e.g. SecondLife);

attributes including caller identifiers such as name, phone number, e-mail address, TCP/IP address; initial contact time; and skills required, for example, service, language or product;

value, for example, an integer number;

a notional colour, for example, one of Red, Green or Blue; and a consumed flag to indicate whether a contact has been processed.

In FIG. 3, contacts represent passive prey for predator Bots. These predator Bots are shown as being located around various points of the table, so for the instant in time shown in FIG. 3, there are 3 Agent Bots $A(1)$, $A(n)$ and $A(m)$; 2 IVR Bots $IVR(1)$ and $IVR(p)$; 1 Auto-Response Bot $AR(q)$; and a supervisor Bot $Sup(1)$. The logical location of these Bots indicates the points from which they are most likely to pick and possibly consume the next contact(s) for processing.

At the same time, portals are adding contacts to the table 300. In FIG. 3, voice contacts are being added from portals $Voice(d)$ and $Voice(e)$, instant message contacts are being added from portals $IM(a)$ and $IB(b)$, while e-mails are being added from portal $E\text{-}mail(a)$.

Portals can either simply add contacts to the database space randomly; at a designated location; or at the next available entry point in memory; or alternatively feed portals can also be implemented with neural Bots, so that they can determine where best to insert contacts within the contact dataspace 300.

So, for example, at least initially the dataspace can be explicitly divided into regions corresponding to skillsets including for example sales, technical support, language, and/or product line. These regions may overlap in any given dimension of the dataspace, they may be orthogonal across dataspace dimensions or indeed any given skillset may occupy a number of non-contiguous regions in a dataspace. Predator Bots can therefore locate initially in one of these explicitly defined regions of the dataspace according to the skillset specified for the Agent, IVR Port or Auto-Response Bot; but thereafter the predator Bots can move about the dataspace based on behaviour learnt implicitly by the predator Bot during operation of the system.

If a portal processing a contact has any information relating to a contact, it can at least initially use the designated region information to choose where to place the contact within the dataspace. As with predator Bots, this can be done explicitly by attempting to match information relating to the contact with the initial designated regions within the dataspace. Where a portal is implemented as a neural Bot, it can learn where best to locate contacts within the dataspace so that they can be picked up by any one of the varieties of contact predator Bot. Thus, after time, the location for instantiating a contact object can be based on the behaviour learnt implicitly by the portal during operation of the system with a view to optimizing value produced by said contact center.

In addition or as an alternative to implementing the portals with neural Bots, contacts themselves rather than being passive can be implemented with associated Bots so that over time they can move within the dataspace 300 to seek out an optimal location where a predator Bot might consume them or indeed actively seek a predator object or Bot. Thus, unattended contacts (prey) could be equipped with the capability (including limited energy) to seek out a predatory neural Bot and/or essentially offer itself for consumption. Learning exhibited by prey Bots might be different than that of predator Bots. Because instances of predator Bots are quasi persistent, each instance would itself mutate over time. However, for prey Bots which are instantiated for each new contact, successive generations of such Bots would be instantiated with behaviour learnt from previous generations of such Bots.

In any case, when a contact object is instantiated, it is given an initial value. For example, E-mail messages would typically begin with the lowest values, Instant messages with an intermediate value and voice calls with the highest value, reflecting the relative desired latency for handling such calls. The value of each such contact would typically increase as a function of the time elapsed from initial contact time to present time. Again e-mails might increase in value at the slowest rate with voice contacts increasing in value at the highest rate. These different values and rates of change of value make some prey are highly attractive whereas others much less so, hence prioritization and discrimination is facilitated.

The colour attribute is used to illustrate how certain prey in the system can be inedible for some Bots but attractive to others. So for example, a voice contact might initially be allocated a colour "Blue" making it inedible to an Agent Bot, but attractive to an IVR Port Bot. An e-mail or IM contact might also be initially coloured "Blue" or some other colour, again making it inedible to an agent contact, but attractive to an Auto-Response Bot.

As an IVR Port Bot begins consuming a voice contact during the course of the workflow, or as an Auto-Response Bot processes an IM or e-mail contact, it will begin to glean information about the contact and this information would be added to the contact attributes. When enough of these attributes are added to the contact, the IVR Port or Auto-Response Bot may change the colour for the contact to "Green" making it slightly more attractive to an Agent Bot and once the IVR Port or Auto-Response Bot has completed processing and for example, a contact is put on hold, the contact colour attribute may be changed to "Red", indicating that it is most edible by (but not necessarily most attractive to) an Agent Bot.

Also, as any predator Bot is processing a contact, it may also alter the value attribute of the contact perceived by subsequent predator Bots when considering candidate contacts for selection. Thus, if a customer provides a name or account details during an IVR session or such details are gleaned by an Auto-Response Bot from an e-mail or IM, the predator Bot might increase (or decrease) the value for the contact based on the perceived value of that customers account.

As will be appreciated from the description below, it is also possible depending on the availability of agents, that an Agent Bot might examine a contact being processed by an IVR Port or Auto-Response Bot during automated processing. If the Agent Bot decided to select such a contact, the Agent Bot could interrupt automated processing to take the contact so that any reward for processing that contact could then be taken by the Agent Bot. Similarly, a supervisor Bot might take over or assist in the processing of a voice contact by an Agent Bot, to for example divide the reward between the two Bots.

In the embodiment, predator Bots' behaviour is governed by how much value they gain and expend in processing contacts. Value gained by a Bot for processing a contact equates to energy for the Bot and this energy is consumed by the Bot in traversing memory to locate contact objects for consumption, in picking and selecting contact objects for processing and possibly in processing the contacts themselves. Net value gained in processing contacts should correlate with the goals of the contact center but while still maintaining the needs and required service levels for customers and appropriate tuning of the parameters of the system can ensure this is the case. So for example, if processing power is at a premium, the energy cost of selecting candidates might be increased. If agent mobility is to be encouraged, for example, by having agents deal with a broader range of contacts, then the energy cost of moving within the dataspace could be decreased. Where agent time is at a premium, then the energy cost of human agent time spent on contacts could be increased.

Thus, it will be appreciated that if a Bot can locate a region within the dataspace within which it can pick and quickly process valuable prey, it will generate maximum value and accordingly contact center performance can be optimised.

The behavior of predator Bots can adapt in many ways, some examples, of which are described below.

At any given time either initially or subsequently, a predator Bot will find itself at a given location with the dataspace 300. The processing agent (human or automated) associated with the Bot, will be consuming contacts at a given rate generating a given value per minute. Agents will move about the dataspace to a given extent and the degree to which they are capable of moving can be tuned by an administrator as costing a given amount of value per notional dataspace distance travelled. In the simple example of FIG. 3, distance is the simple linear distance between contacts $C(1) \ldots C(y)$, however, in more complicated dataspaces, this could be some form of normalised Euclidian distance. If the value/minute rate of an agent improves in any given direction of movement within the dataspace, the Bot will tend to continue to move in this direction and around a given region to find a localised maximum of value/minute.

The predator Bot picks a limited number of contacts in a local region of the dataspace as candidates for processing. The more contacts picked, the more energy consumed in processing the contacts. Each candidate contact is examined to determine the candidate with the highest value or indeed as will be explained later, the highest potential value. The predator Bot may employ many different criteria for selecting a contact, but once the contact is selected, the contact is directed for processing by the processing agent associated with the predator Bot in the conventional fashion, for example, a conference between an agent 20 and the customer 16/18 could be initiated. Once a processing of a contact is completed by a Bot, the Bot can choose either to select the next contact from the previously selected group of candidates; or to re-select a new group of candidates. This decision can again be based on learning from value of picking new candidates vis-à-vis picking from previously selected candidates which should become cheaper in energy terms to select from, because they will be one fewer in the absence of the completed contact, and also because they should have become more valuable to an extent because of the lapse in time since processing the completed contact.

Thus, the rate at which the agent associated with the predator Bot consumes contacts can be used to cause the predator Bot to learn the optimum number of contacts to pick as candidates for processing. In a fruitful region of the dataspace, one Bot may find that only a small number of candidates need to be picked as the value returned from processing those candidates outweighs the costs of selection. However, in other regions of the dataspace, Bots may end up selecting from greater numbers of contacts to ensure that the most beneficial contacts are selected for processing.

In one embodiment of the invention, information from the processing by the agent of a contact is added to the contact object within the dataspace 300, or indeed the contact object within the dataspace can simply be provided with a pointer to such information elsewhere.

This information can be used in a number of ways. For example, by tracking the human time or processing power taken to process the contact, a measure of the energy consumed by the agent to process the contact can be converted into value for the processing agent. Thus, where a human agent took a long time to process a call of a given initial value, they may loose net value for handling the call and so the agent's available energy may decrease. On the other hand, if a contact which appeared to have a given initial value when it was selected for processing resulted in a sale for an agent or completion of a technical support query, the value returned by the system to the predator Bot may be increased vis-à-vis the initial value used by the Bot to select the prey.

This methodology can assist the learning behaviour of any Bot where certain contacts once complete, rather than being removed from the database 300 are instead returned to the dataspace for a limited time as "consumed contacts" with the consumed contact flag set. Such a contact might be picked for selection by another predator Bot because it may have a high value resulting from successful processing by a previous agent. The data pattern for the consumed object can then be learnt by the subsequent predator Bot to assist that Bot in selecting future candidate contacts.

So where an e-mail contact from a given customer X, started with attributes sales, English, PC and an initial value 10, but this resulted in a large order being placed, the consumed object might be returned to the dataspace with a final value 50. Now, if this pattern (having being learnt both by the initial predator Bot and possibly one or more subsequent predator Bots) is used in selecting a subsequent contact, the selecting predator Bot may recognise that one candidate corresponds with a learnt pattern having a low initial value, but potentially a high return value; whereas another candidate may have a median initial value and this could influence the selection of candidate contact for processing.

In another example, assume that predators do not currently become attracted to Social Media contacts until some level of automated conversation has taken place, and information is available about the customer. In this case, a user on Facebook has initiated a session with the contact center. The resulting social media contact attracts an automated conversation program (predator bot), the result of which is that some keyword attributes are associated with the prey and its value is increased. A live agent Bot picks up the now more attractive prey and ultimately a PayPal sale is made. As above, the Facebook contact with all its attributes (source, keywords from analytics etc) remains in the dataspace so that at least some predators can learn that there is potential enhanced value in social media "food" that match or have similar attributes to this one. The outcome is that the predators could adapt their behaviour to compete more readily for future contacts that "look" like the one that turned out to lead to a sale.

The ability of predator Bots, such as Agent Bots to independently adapt and learn behaviour has been explained above and it will be seen how such behaviour can equally be applied to IVR Bots and Auto-Response bots.

Similarly, Supervisor Bots can be implemented and these can also move about the contact dataspace to examine problematic contacts either by conferencing into selected agent calls for contacts having given attributes or for agents having given attributes.

In the embodiments described above where a space is populated by large numbers of separately operating entities i.e. prey Bots and various classes of predator Bots, guaranteeing adherence to contractual Service Level Agreements (SLAs) could become difficult.

Examples of well-known SLA metrics include:
ABA (Abandonment Rate): the percentage of contacts dropped before connection to an agent and without resolution.
ASA (Average Speed to Answer): this can be divided by agent, skillset, contact/media type etc.
TSF (Time Service Factor): typically this comprises an indicator of the number of calls answered by an agent within a given period e.g. 80% answered by an agent in 20 seconds.
FCR (First-Call Resolution): typically a percentage of calls resolved without need for contact center callback or a customer calling back.

Further embodiments of the present invention extend the use of Neural Network Bots to manage the operation of the contact center including maintaining SLA metrics.

While these embodiments are described by way of example with reference to the well-known SLA metrics mentioned above, it will be appreciated that the principle is applicable to other SLA metrics.

In these embodiments, the taxonomy of Bots operating within the contact center is extended to include SLA Bots such as ABA Bots, ASA Bots, TSF Bots and FCR Bots. As will be explained, each such Bot has differing interests, and has the ability to make different modifications to the contact center operating parameters with the goal of enhancing its own personal health score/value/energy to thereby cause the contact center's SLA metrics to be maintained as an intended side effect of the Bots' activities.

In the first instance, the SLA Bots determine if their particular SLA metric is being met or not. In one implementation, the SLA Bot can find out the current value of its metric from existing contact center data feeds. In other implementations, the SLA Bot itself can calculate its metric as described below.

Taking firstly FCR and ABA bots as an example, the synapse weighting of the neural networks in these SLA Bots is designed to predispose the Bot to be interested in "discarded food", that is, "prey" or contact/call bots that have been consumed or completed by other Bots. This is because keeping metrics such as FCR or ABA depends on knowledge from completed "prey" rather than "live" contacts. Thus, an ABA Bot is rewarded (gains value/energy) for inspecting completed contacts.

Having determined the metric, the other side of the behaviour is reacting to what has been learnt. If an ABA Bot sees fit, it has the ability for example to change the treatments (announcement/music etc) given to callers while there are waiting to connect to an agent, and the ability to modify future contact (prey) Bots to make them more attractive to certain agents' (predator) Bots. This allows the ABA Bot to influence its score based on the lessons learnt in its internal neural network.

Furthermore, an ABA Bot receives high reward for keeping the abandon rate within a threshold. For example, if an ABA Bot notices that the abandon rate on calls with the "LCD TV Sales" attribute is too high, then for future prey Bots with this characteristic, the ABA Bot has the authority to add more attributes, such as "General Sales" to widen the pool of possible predator Bots to which such prey is attractive, or to increase the reward to predator Bots for servicing contacts of this type.

In various implementations, an SLA Bot can be given permission to modify the attributes of the agents' (predator) Bots (not just the prey Bots as described above). For example, the SLA Bot could adding contact types to those that would originally have been attractive and serviced by certain agents' (predator) Bots.

ASA and TSF Bots are programmed differently to ABA bots. When calculating their current metric, an ASA or TSF Bot is much more interested in prey Bots that have only just been instantiated, or have only just been processed by an IVR Bot. An ASA Bot pays less attention to completed contacts, whereas completed contacts attract an ABA Bot.

In one example, an ASA Bot manages email contacts in addition to voice contacts. For example, an email might comprise a query relating to "Family Health Insurance". When the email response SLA metric is in danger of being breached, the ASA Bot can take similar actions to those described above. That is, it can increase the value to predator Bots of consuming the email, and/or widen the field of matching predator Bots by making allowable changes to the attributes of the prey Bot for the contact or the predator Bots for various agents. Then this email(s) becomes more likely to be consumed in the very near future.

In another illustrative example, within an airline contact center, an FCR Bot could identify a pattern of incoming prey Bots with CLIDs (Caller Line Identity Display) seen within the last 24 hrs on calls with a "Lost_Baggage_Query" attribute. This is corresponds with a degradation of the FCR SLA metric, because customers with lost luggage are not obtaining resolution and are calling back repeatedly.

In this case, the FCR Bot takes action to bring the FCR SLA back into line. It can, for example, begin to automatically conference in available experienced agents to lost baggage calls that are being dealt with by agents who are correlated with the repeat-callers. The customer is therefore more likely to gets the information required first time, and the FCR metric to start to fall back in line.

From the above examples, it can be seen that SLA Bots can operate autonomously within a contact center adapting their behaviour and/or the behaviour of other Bots operating within the contact center to maintain SLA metrics within required standards.

It will be appreciated that predator Bots, in particular Agent Bots may perform very differently from one another in a system according to the invention and it is possible that some agent's performance may be reflected in Bots which accumulate little value; or indeed run out of energy. Supervisor Bots can therefore be trained to listen in or monitor the performance of such Bots to determine if the problem lies with the agent associated with the Bot or the tuning of the system.

While the above-described embodiment has set out the principles underlying the invention, other embodiments are equally possible. For example, all parties—both predator and prey—could be modelled as unordered objects, and stored in a Javaspace (http://java.sun.com/developer/technicalArticles/tools/JavaSpaces/). In this case, predator bots could have listeners registered with the JavaSpace so that they receive a notification every time a new prey object is inserted into the JavaSpace (a newPrey event). The prey objects could have the capability to query the characteristics of the predators in the system. For example, they could extract an unordered list of a random selection of current predators that have specified characteristics (a "lucky dip" approach). They could then attempt to offer themselves to the predator(s) by calling a 'pleaseEatMe' method on that predator. Likewise the predators, may choose to ignore most/all of the incoming newPrey events, and decide to take the same "lucky dip" approach as the prey. Thus rather than beginning with explicit knowledge provided by programmers, learning could be completely built up implicitly over time by predators and prey so eventually each of the predators and prey should learn sufficiently from random selection which prey to consume and refuse; and possibly on the other hand which predator to make an offer to and possibly which to avoid.

Another alternative comprises each predator conducting a continual sweep of objects within the Javaspace for all potentially suitable prey objects/bots with the predator eventually learning and narrowing down its field of search with occasional mutation with a view to determining if other regions of the Javaspace may be more fruitful. Equally, active prey Bots could be doing a similar sweep in a reverse direction in such an embodiment.

Again in each of these variants one or both of the agents and/or contacts can be implemented with Bots while a party not implemented with a Bot may simply comprise a passive object. Where both predators are prey are implemented with Bots, both the "workers" and the "jobs" in a contact center begin to actively seek each other out in a continually adaptive fashion, always learning and optimising behaviours by defining paths that lead more often to reward.

In summary, the reward system in a contact center according to the present invention should reflect the business objectives of the center. Examples of how the parameters of Bots would be set up include:

Realtime contact types having high value as perceived by appropriate predators. The prey bot of a voice contact type should have high mobility to seek voice-enabled agents. Low mobility is given to Neural Bots of email contacts, and mid-level mobility to near-realtime contacts such as IMs. Clustering is likely to occur between such categories, which increases competition.

Relative to a human agent, the parameters of IVR Port Neural Bot would have greater ability to seek and consume a voice contact, but an Agent Bot might be permitted to interrupt certain IVR Port processing and steal the reward.

Email contacts would have low value, but would be made to appear attractive to Auto-Response Bots. Once consumed by an Auto Response predator Bot, an email prey (Bot or object) should mutate to become more attractive to an agent predator over time.

These criteria should mean that a type of "hunting" is likely to occur, as suitably qualified predators begin to cluster where high value prey has been found previously and so optimise contact center performance.

In systems with both active predators and prey, an agent that is adept at attracting contacts is likely to have "followers"—predators that have learned that prey is attracted to this agent. These predators in turn consume contacts that are attracted by the good performance of the skilled predator(s), and a cluster could develop. Such clustering could actually lead to an increase in performance of the system and could be allowed to develop as long as it did not lead to other degradation of customer experience of the contact center.

Where contact information is not immediately discarded when a contact has been "consumed" by a predator, or when the customer session has ended, but allowed to persist for a period of time in order for other predators to learn from the outcome, the system could exhibit the ability to modify its behaviour to optimise revenue for the contact center by learning from outcomes.

In further variations of the above-described embodiments, prey objects could be modelled as JMS messages, and copies popped off a list by predators. The system could be implemented as a series of JMS queues with certain characteristics (email/voice prey etc).

The invention is not limited to the embodiment(s) described herein but can be amended or modified without departing from the scope of the present invention.

What is claimed is:

1. A method for assigning individual contact processing resources of a contact center to contacts in the contact center, the contact center comprises a server having a work assignment engine and a dataspace coupled thereto, the method comprising:
   receiving, by the contact center, a new contact at the contact center;
   accessing, by the work assignment engine, the new contact;
   instantiating, by the work assignment engine, a respective contact object, that corresponds to the new contact, within the dataspace,
   storing in the dataspace, a population of contact objects that correspond to contacts being processed by the contact center, said dataspace being divided into regions corresponding to skill sets,
   assigning, by the work assignment engine, the respective contact object an initial value reflecting a relative desired latency for handling such contacts by the contact center,
   increasing, by the work assignment engine, the assigned value of the respective contact object as a function of the time elapsed from an initial contact time to a present time;
   creating and associating, by the work assignment engine, a respective programmed processing object with a corresponding one of a plurality of individual contact processing resources of the contact center, each programmed processing object comprising a respective predatory neural network arranged to compete with other programmed processing objects to adaptively and independently select contact objects from said population of contact objects based on:
      a value received by said programmed processing object for processing contact objects from said population and
      a value spent by said programmed processing object on processing contact objects from said population,
   initially locating the respective programmed processing objects in the regions of the dataspace according to a skill set specified for its corresponding contact processing resource;
   moving a particular one of the respective programmed processing objects from an initial region in the dataspace to a more optimum region in the dataspace based on behavior learned during processing of contact objects;
   selecting, by the work assignment engine, a particular one contact object by the particular one programmed processing object of the contact center; and
   assigning, by the work assignment engine, to the contact corresponding to the particular one contact object, the contact processing resource corresponding to the particular one programmed processing object.

2. A method according to claim 1 wherein each contact object corresponds with a respective contact programmed processing object arranged to seek an individual contact processing resource of the contact center for said contact by migrating said contact object within a dataspace storing said population of contact objects.

3. A method according to claim 2 wherein behaviour of said contact programmed processing objects adapts with successive generations of such objects.

4. A method according to claim 1 wherein suppliers of new contacts to said contact center comprise respective programmed processing objects arranged to adaptively locate contact objects within the dataspace storing said population of contact objects based on optimizing value produced by said contact center.

5. A method according to claim 1 wherein said contact processing resources correspond with any one of a human agent, a supervisor, an IVR Port, an Auto-Response Simulator, or other human or automated service that may be of use in servicing the contact.

6. A method according to claim 1 wherein each contact object comprises one or more types of attributes including: contact media type, contact specific attributes, or contact value.

7. A method according to claim 6 wherein each contact object further comprises an attribute indicating a type of programmed processing object which might select said contact object.

8. A method according to claim 7 wherein said programmed processing object type indicator is a discrete valued variable.

9. A method according to claim 1 wherein each contact object comprises a respective consumed flag to indicate whether said contact object has been previously processed by any of the respective programmed processing objects.

10. A method according to claim 6 wherein said contact media type comprises one of: voice, e-mail, Instant Message, web chat, social media communication, or virtual world communication.

11. A method according to claim 6 wherein said contact specific attributes include one or more of: caller identifier, caller name, phone number, e-mail address, TCP/IP address, initial contact time, and contact skills required.

12. A method according to claim 1 wherein said adaptive selection of contact objects by programmed processing objects comprises learning to select between contact objects in a sub-set of said population of contact objects based on a value received or spent for processing a previous contact object.

13. A method according to claim 1 wherein the particular one programmed processing object is arranged to change a value associated with the particular one contact object based on processing of the corresponding contact by the corresponding contact processing resource.

14. A method according to claim 9 wherein at least some of said programmed processing objects are arranged to update a consumed flag for a contact object on completion of processing that contact object so that other programmed processing objects can adapt their behaviour based on said processing.

15. A method according to claim 12 wherein said adaptive selection comprises learning to select the number of contact objects in said sub-set of said population of contact objects from which to select a contact object for processing.

16. A method according to claim 12 wherein said adaptive selection comprises learning to select a location among said population of contact objects from which to select said sub-set of said population of contact objects.

17. A method according to claim 1 further comprising tuning respective values associated with selecting contact objects, processing contact objects and moving programmed processing objects in the dataspace to optimize value produced by said contact center.

18. A method according to claim 6 further comprising tuning a rate of change of value of respective media types to optimize value produced by said contact center.

19. A method according to claim 1 comprising:
instantiating one or more service level agreement programmed processing objects;
autonomously adapting, by the one or more service level agreement programmed processing objects, operational attributes of said contact center to maintain Service Level Agreement (SLA) metrics for said contact center.

20. A method according to claim 19 wherein said metrics include one or more of Abandonment Rate (ABA), Average Speed to Answer (ASA), Time Service Factor (TSF), or First-Call Resolution (FCR).

21. A method according to claim 20 wherein a service level agreement programmed processing object maintaining an ABA or FCR metric determines a value for said metric from contact objects which have been processed by other programmed processing objects.

22. A method according to claim 20 wherein a service level agreement programmed processing object maintaining an ASA or TSF metric determines a value for said metric from contact objects which have either not been processed by other programmed processing objects or have only been processed by another programmed processing object corresponding to an IVR port.

23. A method according to claim 19 wherein said service level agreement programmed processing objects alter one or more attributes of contact objects and/or other programmed processing objects within the contact center.

* * * * *